(12) United States Patent
Kaemingk et al.

(10) Patent No.: US 8,004,695 B1
(45) Date of Patent: Aug. 23, 2011

(54) MEASUREMENT OF FILM THICKNESS IN MOTOR EXHAUST SYSTEMS

(75) Inventors: Nathan Jon Kaemingk, Lynden, WA (US); Michael Gerty, Bellingham, WA (US); Daniel William Sloan, Burlington, WA (US)

(73) Assignee: PACCAR Inc., Bellevue, WA (US)

(*) Notice: Subject to any disclaimer, the term of this patent is extended or adjusted under 35 U.S.C. 154(b) by 0 days.

(21) Appl. No.: 12/857,226

(22) Filed: Aug. 16, 2010

(51) Int. Cl.
*G01B 11/28* (2006.01)
(52) U.S. Cl. .................... 356/630; 356/635
(58) Field of Classification Search ........ 356/625–636, 356/241.1–241.6; 250/559.07, 559.22
See application file for complete search history.

(56) References Cited

U.S. PATENT DOCUMENTS

| | | | |
|---|---|---|---|
| 3,625,613 A | 12/1971 | Abell | |
| 4,355,904 A * | 10/1982 | Balasubramanian | 356/608 |
| 4,660,970 A * | 4/1987 | Ferrano | 356/3.03 |
| 4,963,018 A * | 10/1990 | West | 356/3.05 |
| 4,967,092 A * | 10/1990 | Fraignier et al. | 250/559.07 |
| 5,241,367 A | 8/1993 | Grob | |
| 5,549,472 A * | 8/1996 | Eustathios et al. | 432/103 |
| 6,871,489 B2 | 3/2005 | Tumati | |
| 7,084,963 B2 | 8/2006 | Leipertz | |
| 7,164,476 B2 * | 1/2007 | Shima et al. | 356/241.1 |
| 7,236,255 B2 * | 6/2007 | Kodama et al. | 356/601 |
| 7,480,044 B2 | 1/2009 | Leipertz | |

* cited by examiner

*Primary Examiner* — Sang Nguyen
(74) *Attorney, Agent, or Firm* — Christensen O'Connor Johnson Kindness PLLC

(57) ABSTRACT

Systems and methods are provided for measuring the thickness of a film on an interior surface of an exhaust pipe system of a vehicle. The film is typically a layer of a nitrogen-oxides reductant, such as urea, deposited during operation of a selective catalytic reduction system for eliminating pollutants in an exhaust stream. The methods and systems are directed to optical measurements that directly probe the interior surfaces of the exhaust system to determine the thickness of a urea film built up during operation of the engine and the selective catalytic reduction system.

20 Claims, 3 Drawing Sheets

MEASUREMENT OF FILM THICKNESS IN MOTOR EXHAUST SYSTEMS

BACKGROUND

New air-pollution limits for diesel engines have caused some manufacturers to adopt selective catalytic reduction (SCR) technology for reducing nitrogen oxides (NOx) in engine exhaust (e.g., diesel engine exhaust). The SCR process introduces ("injects") an NOx reductant solution—typically a urea-water solution—into the hot exhaust gas. The reductant chemically reduces NOx into non-pollutant compounds at a catalyst substrate.

One type of prior art diesel engine exhaust system that employs an SCR process is illustrated in FIG. 1. As best shown in FIG. 1, a diesel engine 4 produces NOx as a component of an exhaust stream. The exhaust stream is directed from the engine 4 into the exhaust system 6, which includes a doser or injector section 8 in gaseous communication with an exhaust port of the engine 4 through an exhaust pipe 10. The doser section 8 includes a urea doser or injector 12 that is configured to inject a solution of urea (or other nitrogen oxides reductant) into the exhaust stream present in the doser section 8.

Referring still to FIG. 1, after the urea doser 12 injects urea into the exhaust stream, the exhaust travels through an exhaust pipe 14 to a catalytic section 16, where the urea and a catalyst within the catalytic section 16 react to reduce the nitrogen oxides into non-pollutant species. The reduced nitrogen oxides and remaining exhaust components are then directed out of the vehicle through an exhaust outlet pipe 18.

However, during typical operation of an engine, the conditions for the SCR process are not optimal (e.g., the exhaust is too hot or cold) and either too much, or too little, urea solution is introduced into the exhaust. When urea solution is introduced that does not undergo the SCR process (e.g., too much urea solution for the exhaust temperature), urea crystals will accumulate within the exhaust system, both on the interior surface of the exhaust pipe and at the port that introduces the solution into the exhaust. Build-up of urea crystals in the exhaust system detrimentally affects the performance of the exhaust system and also is indicative of an inefficiency in the SCR process—urea crystals represent both wasted urea solution and reduced SCR efficiency.

Simple visual inspection of the exhaust pipe is sufficient to qualitatively determine if urea crystals are present on the surface of the exhaust pipe. However, no methods are currently capable of real-time quantitative measurement of the amount (i.e., thickness) of urea crystals on the surface of the exhaust pipe. Embodiments of the present disclosure are directed to such methods, and systems for performing the methods.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method is provided for comparing a thickness of a film of a reductant for nitrogen oxides on an interior surface of an exhaust pipe system to exhaust pipe system conditions, wherein the exhaust pipe system comprises an exhaust pipe connected to an exhaust port of a nitrogen-oxides producing engine and a selective catalytic reduction injector configured to introduce a reductant solution of the reductant into the exhaust pipe, the method comprising: measuring a first thickness of the film at a measurement location within the exhaust pipe system at a first measurement time; introducing a reductant solution from the injector into the exhaust pipe during operation of the engine; measuring a second thickness of the film at the measurement location at a second measurement time; determining at least one exhaust pipe system condition; and comparing the first thickness of the film and the second thickness of the film with the at least one exhaust pipe system condition between the first measurement time and the second measurement time.

In another aspect, a system is provided for measuring a thickness of a film of a reductant for nitrogen oxides, comprising: an interior surface of an exhaust pipe system, measurement location; and a light detector in optical communication with the measurement location and the light source.

DESCRIPTION OF THE DRAWINGS

The foregoing aspects and many of the attendant advantages of the claimed subject matter will become more readily appreciated by reference to the following detailed description, when taken in conjunction with the accompanying drawings, wherein:

DETAILED DESCRIPTION

Figure 1:
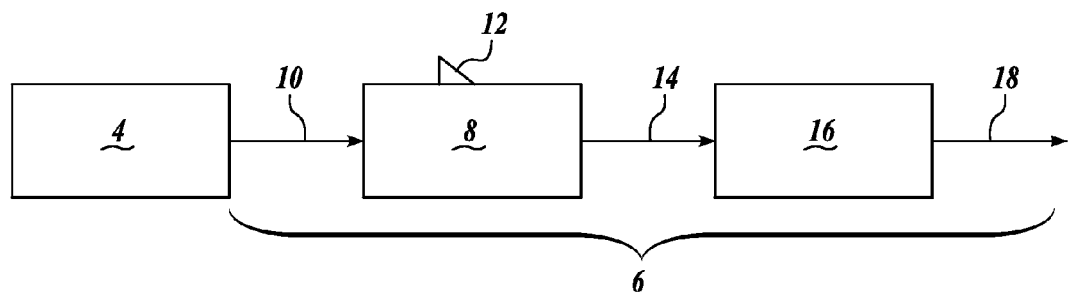
FIG. 1 is a schematic diagram of a prior art exhaust system.

Embodiments of the present disclosure will now be described with reference to the drawings, where like numerals correspond to like elements. Embodiments of the present disclosure are generally directed to systems and methods for measuring the thickness of a film on an interior surface of one or more exhaust pipe system components of a diesel or like powered vehicle, such as a Class 8 truck. The film is an accumulation or layer of an NOx reductant, such as urea. More particularly, embodiments of the present disclosure are directed to optical measurement systems and methods that directly probe the interior surfaces of the exhaust system to determine the thickness of an NOx reductant film built up during operation of a diesel engine (or like engine that produces NOx). By determining (e.g., in real time) the thickness of an NOx reductant film on an interior surface of one or more exhaust system components, the conditions within the exhaust system (e.g., exhaust temperature, flow, etc.) can be compared and/or correlated to the film thickness so as to provide information useful for optimizing the amount and timing of the NOx reductant injection into the exhaust stream so as to minimize NOx reductant film formation.

One representative use of the exemplary systems and methods of the present disclosure is for tuning the SCR process, including urea injection characteristics, in relation to a particular type of engine and exhaust system, such that during operation of the engine under various conditions (e.g., cold start, idle, high speed operation, etc.), the urea injected into the exhaust system is less likely to form a film on the interior surface of the exhaust system (compared to prior art systems), but instead travels to the intended destination at the catalyst.

Although exemplary embodiments of the present disclosure will be described hereinafter with reference to over-the-road vehicles, particularly diesel-powered, heavy-duty trucks, it will be appreciated that aspects of the present disclosure have wide application, and therefore, may be suitable for use with many other types of vehicles that include a urea or other nitrogen-oxides reductant injection system for treating nitrogen oxides emissions in an exhaust stream, such as automobiles, recreational vehicles, boats, etc. Examples of the subject matter of the present disclosure may find other applications, such as the treatment of exhaust streams of stationary or portable generators, etc. Accordingly, the following descriptions and illustrations herein should be considered illustrative in nature, and thus, not limiting the scope of the claimed subject matter.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

As briefly described above, embodiments of the present disclosure are directed to methods and systems for measuring the thickness of an NOx reductant film, such as urea, built up on an interior surface of an exhaust system. Urea film measurement provides valuable information regarding the operation of the exhaust system, as the formation of a urea film indicates an inefficiency in the SCR process. Urea deposits can potentially block the exhaust pipe or the urea dosing pathway. They also represent inefficiency in the system since the urea in deposit form is not available for the purpose of the injection, which is to reduce NOx.

The following description provides specific exemplary embodiments with reference to a solid urea film and a diesel engine, but the invention is not limited to these illustrative embodiments. Embodiments of the present disclosure are particularly useful when used with a portion of an exhaust system in liquid communication with a urea doser or injector.

Figure 2:
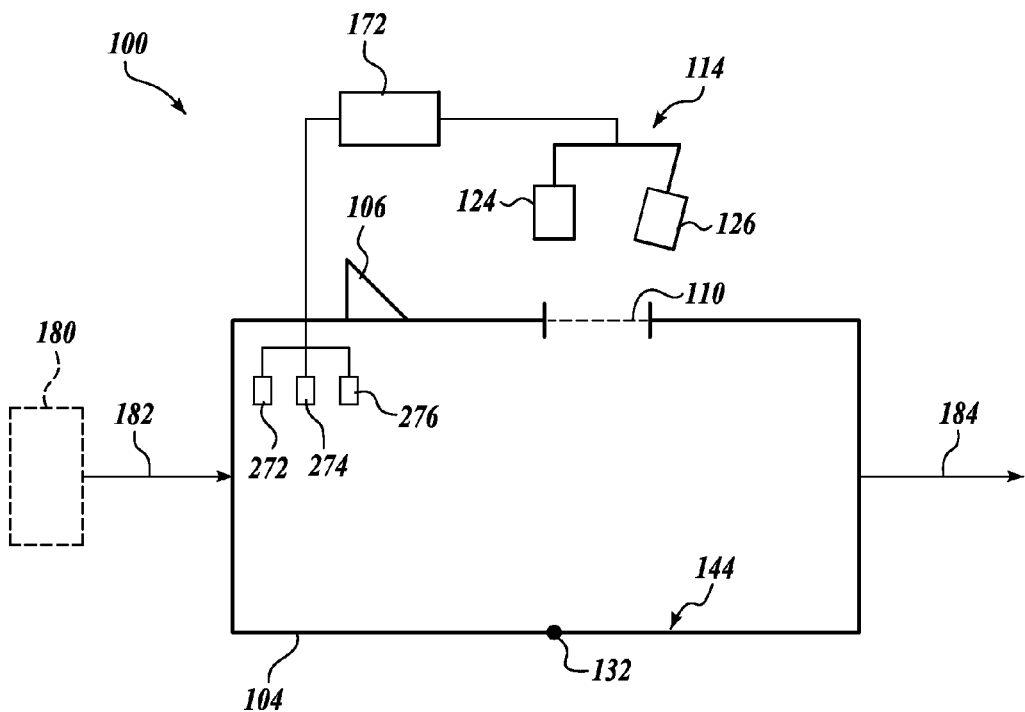
FIG. 2 is a schematic diagram of an embodiment of a system for measuring the thickness of urea on an interior surface of an exhaust pipe system in accordance with aspects of the present disclosure.

Turning now to FIG. 2, there is shown one example of a system for measuring the thickness of an NOx reductant film on an interior surface of an exhaust system. As best shown in FIG. 2, the measurement system, generally designated 100, includes an exhaust system section 104 having an NOx reductant injector 106 and an optical window 110. Exhaust is generated by a source of NOx 180 (e.g., a diesel engine) and transported to the exhaust system section 104 by an exhaust pipe 182. After passing through the exhaust system section 104, the exhaust (e.g., treated with NOx reductant) is transported further "downstream" by exhaust pipe 184 (e.g., to a catalyst, etc.).

The measurement system 100 further includes an optical measurement assembly 114 that includes an emitter 124 and a detector 126 both in optical communication with a measurement location 132 disposed on an interior surface 144 of the exhaust system section 104 via the optical window 110. In use, the emitter 124 emits an optical signal 136 that travels through the optical window 110 toward the interior surface 144 and impinges on the measurement location 132. A returned (e.g., reflected) optical signal 138 returns through the optical window 110 to the detector 126 for signal processing. Based on the known characteristics of the emitted signal 136 (e.g., timing, intensity, wavelength, etc.) and a measured property of the reflected signal 138, the thickness of a solid film at the measurement location 132 can be determined.

In exemplary embodiments, a displacement sensor is used as the optical measurement assembly 114. For example, a semiconductor laser displacement sensor based on a charge-coupled device (CCD) detector.

The exemplary embodiments described herein refer to the optical signals used to measure urea film thickness as lasers. However, other optical signals can be used so long as the thickness of a solid urea film can be measured using an optical signal 136 delivered by the emitter 124 and received by the detector 126. Non-laser optical signals include but are not limited to optical signals produced by light-emitting diodes and fluorescent lighting.

Figure 3:
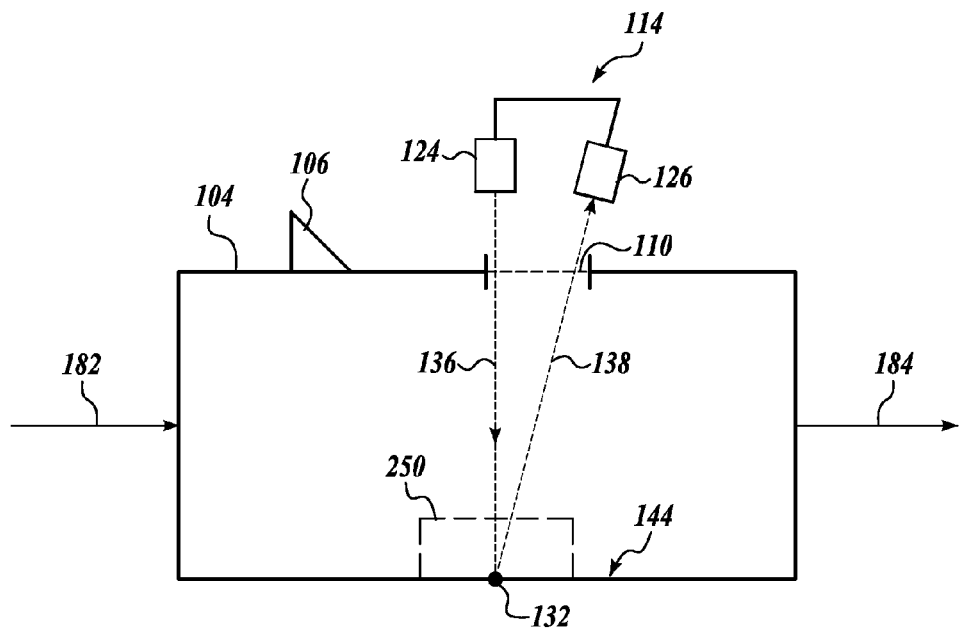
FIG. 3 is a schematic diagram of the system of FIG. 2 in operation to measure the thickness of the urea at a measurement location.

Turning now to FIGS. 2-7, the components of the measurement system 100 will be described in greater detail. As best shown in FIG. 3, the optical window 110 provides an optical path for the emitted and reflected signals to propagate between the measurement location 132 disposed on the interior surface 144 of the exhaust system section 104 and the optical measurement assembly 114. In the embodiment shown in FIGS. 2-7, the optical window 110 is positioned intermediate, via line of sight, the measurement location 132 and the emitter 124 and the detector 126. In several embodiments, the optical window 110 is downstream (according to an exhaust-stream point of reference) from the injector 106, although other locations are within the scope of the claimed subject matter. For example, the optical window 110 can be positioned anywhere along the exhaust system section 104 that provides optical communication between the emitter 124, the detector 126, and the desired measurement location 132.

As used herein, the measurement location 132 is the location on the interior surface 144 of the exhaust system that is impinged upon by the optical signal 136. In one embodiment, the measurement location 132 is positioned downstream from the injector 106, as the measurement location 132 is positioned where urea buildup may occur on an interior surface of the exhaust system section 104 (or other part of the exhaust system 100). Therefore, in a representative embodiment, the measurement location 132 is in liquid communication with the injector 106.

Figure 4:
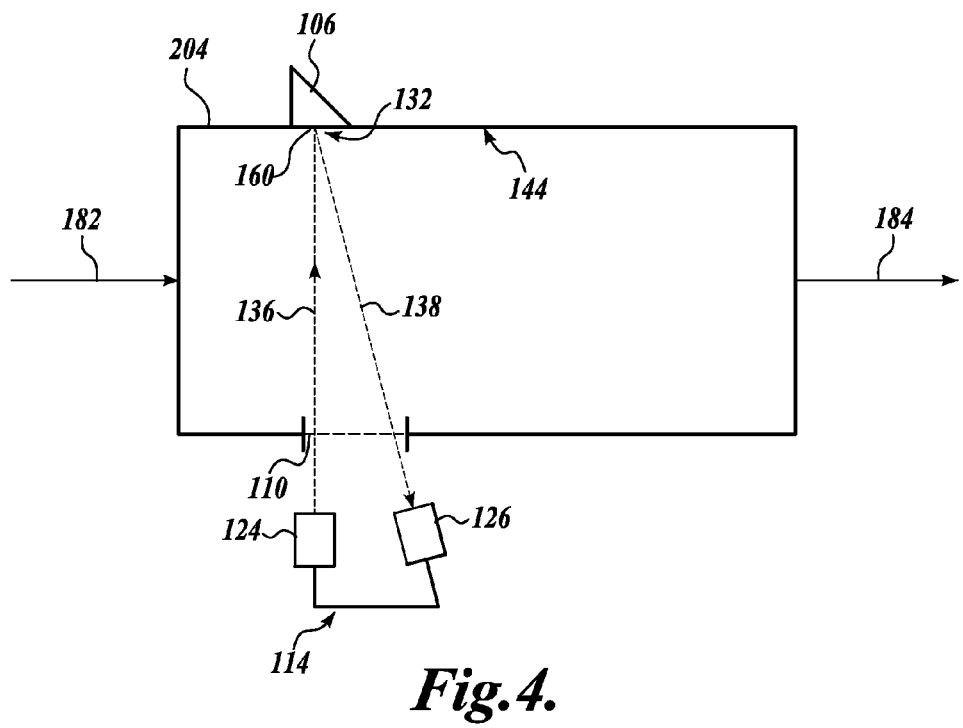
FIG. 4 is a schematic diagram of a system similar to FIGS. 2 and 3, wherein the surface of the exhaust pipe system measured for urea thickness is a surface of a urea injection port.

It will be appreciated that the measurement location 132 can be located on any inner surface of the exhaust system 100, including a surfaces near or around the outlet port 160 of the injector 106, as illustrated in the exemplary exhaust system section 204 of FIG. 4. A urea film 252 can build up not only on the walls of the exhaust system section 204, but also on or inside a surface of the outlet port 160 itself. In the embodiment illustrated in FIG. 4, the optical window 110, emitter 124, and detector 126 are positioned and configured such that the emitter 124 and detector 126 are in optical communication with the measurement location 132 positioned on a surface 160 of the injector 106.

Figure 5:
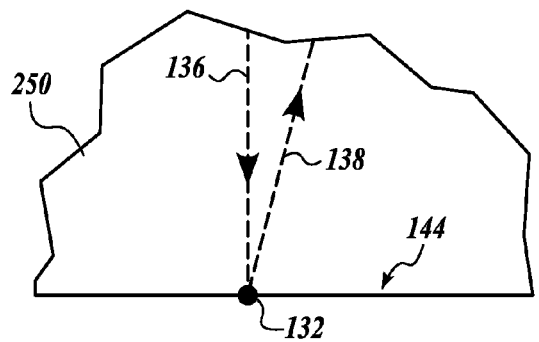
FIG. 5 is a detailed view of the interior surface of the exhaust pipe system illustrated in FIG. 3 at the first measurement location.
Figure 6:
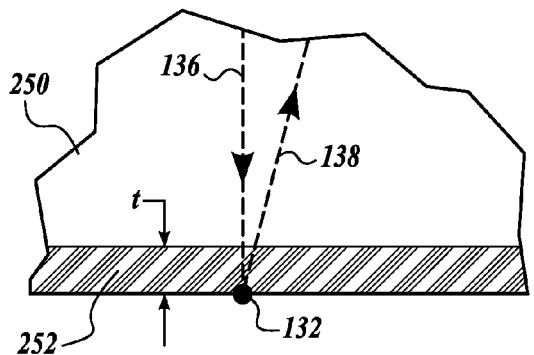
FIG. 6 is a detailed view of the measurement location of FIG. 3, similar to FIG. 5, but including a urea film.

An exemplary embodiment of the film thickness measurement system and method of the invention is illustrated in FIGS. 5 and 6. FIG. 5 illustrates a detailed view 250 of a portion of FIG. 3, wherein the optical signal 136 impinges on the measurement location 132, and the returned signal 138 reflects off of the measurement location 132. In FIG. 5, the measurement location 132 has no urea film adhered to the interior surface 144 of the doser section 104. Conversely, FIG. 6 illustrates the detailed portion 250, wherein a urea film 252 has a thickness t that is measured at the measurement location 132 by the optical signal 136 and returned signal 138. The difference in the characteristics of the returned signal 138 after interacting with the urea film 252 (FIG. 6) compared to the absence of film being present (FIG. 5) results in different measurements of the thicknesses of the urea film 252 at the measurement location between FIG. 5 and FIG. 6.

Returning to FIG. 2, the emitter 124 and detector 126 are communicatively coupled to a control unit 172 that controls the operation of the emitter 124 and the detector 126 and optionally processes the data generated by the emitter and detector for determining the thickness of the film at the measurement location 132. In one embodiment, the control unit 172 may include one or more computers, computing devices, microcontrollers, programmable logic controllers, etc., and/or combinations thereof, that are capable of generating appropriate control signals for the emitter/detector and employing standard measurement and analysis techniques, as known to those of skill in the art, for transforming the reflected signal measured by the detector 126 into a urea film thickness. It will be appreciated that components of the control unit 172 can be implemented in hardware, software, or a combination of hardware and software.

Figure 7:
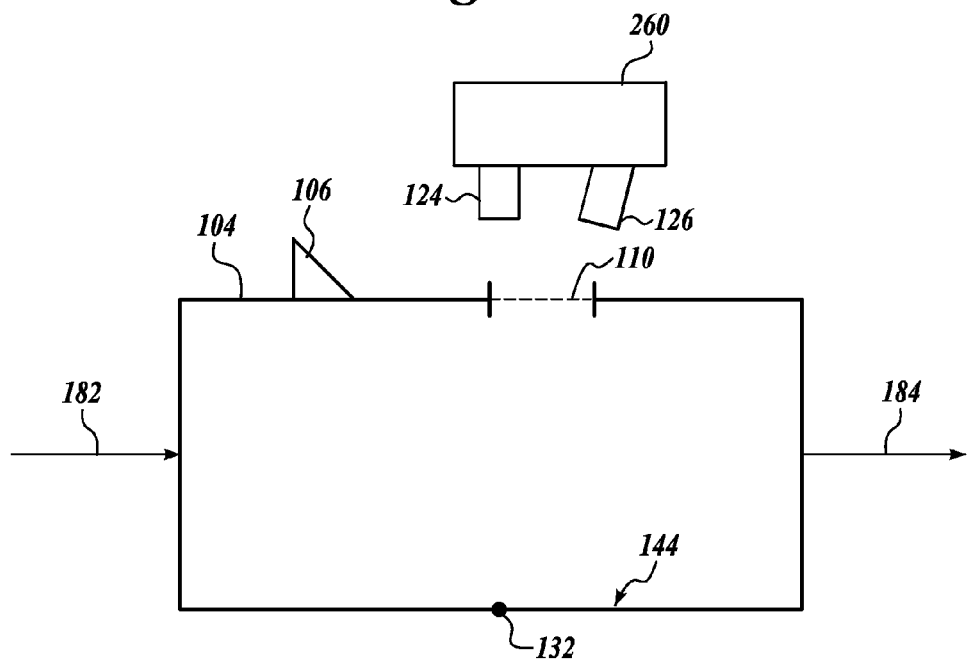
FIG. 7 is a schematic diagram of another embodiment of a system for measuring the thickness of urea on an interior surface of an exhaust pipe systems in accordance with aspects of the present disclosure.

It will be appreciated that the emitter 124 and detector 126 can be separate devices that are operatively linked so as to provide information regarding the thickness of the urea film at the measurement location 132. Alternatively, as illustrated in FIG. 7, the emitter 124 and detector 126 can be housed in a single optical signal device 260.

In embodiments of the present disclosure, optimization of the performance of an SCR system can be accomplished by monitoring the thickness of a urea film at a measurement location 132 during operation of an engine attached thereto. The optimization of the SCR process with regard to exhaust system conditions is accomplished in one embodiment by monitoring the thickness of the urea film and comparing the thickness to a known characteristic of the exhaust system. Representative characteristics of the exhaust system include exhaust flow rate, exhaust temperature, urea injector (i.e., outlet port 160) configuration (e.g., injection angle, amount, timing, spray shape, and speed), exhaust flow field, exhaust pipe shape, liquid urea wetting the walls of the exhaust system, time, exhaust system wall temperature, urea decomposition state (i.e., the chemical components of urea as it decomposes), and exhaust humidity.

In an exemplary embodiment, regressive parametric modeling can be used to model the input factors (e.g., exhaust flow rate, etc.) effects on the output response (i.e., urea film growth). Other modeling methods include neural networks or any type of mathematical model.

A single, or plurality, of exhaust system conditions can be determined and compared to the measured thickness of the urea film 252. Exhaust pipe conditions (e.g., exhaust temperature, exhaust flow volume, exhaust flow speed) can be measured using methods known to those of skill in the art. An exemplary method for measuring exhaust pipe conditions is the use of one or more sensors, as are known in the art. Referring to FIG. 2, a plurality of sensors 272, 274, and 276 are disposed within the doser section 104 for measuring exhaust pipe conditions (e.g., sensor 272 measures exhaust temperature, sensor 274 measures exhaust flow volume, and sensor 276 measures exhaust flow speed). Sensors 272, 274, and 276 are communicatively coupled to the control unit 172 such that the measured exhaust pipe conditions can be correlated to the operation of the optical measurement assembly 114.

In one exemplary embodiment of the present disclosure, the thickness of the urea film 252 is measured at the measurement location 132 at a first time and a second, later time. In between the first time and the second time, one exhaust pipe condition is determined (e.g., the temperature of the exhaust flow). If the exhaust flow temperature is at a steady state, then the first measurement and second measurement of the thickness of the urea film can be compared to the exhaust gas temperature and a determination made as to the effect of the exhaust gas, at the determined temperature, on the thickness of the urea film. For example, if the urea film grows in thickness, then the determined temperature of the exhaust gas will likely be determined to have a negative affect on the SCR process because the temperature is not optimized to decrease, or maintain, the thickness of the urea film 252 on the interior surface of the exhaust system section 104.

The real-time measurement capabilities of the provided embodiments allow for continuous monitoring of the thickness of the urea film and, thus, the effect of the adjustment of different exhaust pipe conditions can be determined in real time (e.g., an almost infinite number of measurement points can be used and compared/correlated to the modifications of the exhaust pipe conditions that lead to changing urea film thicknesses measured by the system). Continuing with the exemplary exhaust pipe condition of exhaust temperature, using continuous real time measurement of the urea film thickness, an exemplary method of use for the system for optimizing the exhaust temperature in relation to urea film thickness includes: beginning at a first exhaust gas temperature, raising the exhaust gas temperature, and lowering the exhaust gas temperature below the initial temperature. Thus, at least three temperature points are measured, and the effect of the different temperatures on the urea thickness can be determined. If real-time measurements are used, then a continuous comparison of film thickness to temperature can be determined. Using methodology such as this, an optimal exhaust gas temperature can be determined that minimizes and/or eliminates urea buildup in the exhaust system.

While a single exhaust pipe condition (exhaust gas temperature) has been described in the above exemplary embodiment, further embodiments of the invention include the comparison/correlation of multiple exhaust pipe conditions to the thickness of the urea film. Given the complexities introduced by correlating multiple conditions to film thickness, the use of computation methods, as are known to those of skill in the art, are typically used in such embodiments.

Each of the representative exhaust pipe conditions described herein will now be discussed in more detail.

Exhaust flow rate is the mass of exhaust gas that exits the engine exhaust valves. The exhaust flow rate in an engine without air leaks can be considered to be the sum of total wet air mass and total fuel mass injected and can also include the mass of exhaust system injections of any substance upstream of the measurement point, such as fuel, air, syngas or any method of introducing mass into the system which is evacuated through the exhaust system. Exhaust flow can be considered as exhaust velocity, which is a product of the exhaust mass and the exhaust gas density.

Exhaust Temperature is the mean gas temperature measured directly upstream of the measurement location 132. Exhaust temperature can also be measured as the mean gas temperature of the exhaust directly downstream of the measurement location 132 so as to determine the change in mean temperature after injection of urea and heat loss to the ambient air surrounding the exhaust system.

Injector configuration includes the injector droplet size distribution, injection cone angle, injector hole size (diameter and length), injection pressure, injector nozzle design, injection flow rates, air assisted or non air assisted injector designs, introduction methods, injection chamber design, and injection chamber and pipe interactions.

Exhaust pipe shape includes the geometric shape of the exhaust pipe where the injection is introduced, any mixing device that is in the exhaust stream, the injection chamber interactions with the primary exhaust flow, the exhaust pipe shape downstream or upstream of the measurement location 132, which may contain bends or elbows, changes in size, pipe junction irregularities, perforated tubing, exhaust flex sections or bellows, exhaust turbines, catalyst packaging can ends, and interfaces with the catalyst face and catalyst materials.

Exhaust flow field is the localized exhaust velocity in any dimensioned space within the exhaust system that the exhaust gas is flowing through. The exhaust flow field will show the different exhaust vectors within each predetermined space to determine the affect of exhaust momentum as a result of the exhaust system geometry and the exhaust flow rate. The flow field moments may produce phenomenon which may collectively be described as counter-rotating vortices, rotational inertia, shear-driven cavities, recirculation zones, or any number of phenomenon known to in the field of fluid dynamics and the simulation of fluid dynamics known as computational fluid dynamics.

Regarding the speed at which urea film thickness measurements can be acquired, the system is limited only by the operating speed of the emitter 124 and the detector 126, and the related means for processing the received signal. Laser emitter/detector systems are known to operate into the femtosecond regime, although such speed is not likely necessary for applications of the methods disclosed herein. Typical off-the-shelf laser systems can be operated at speeds greater than 1 Hz, and thus, several measurements per second can be acquired. As used herein, the terms "real time" or "essentially real time" refer to measurement speeds of 1 Hz or greater.

In embodiments of the invention, measurement of the film thickness is accomplished in real time. Real-time measurement of the thickness of the built-up urea film 252 is possible using laser (or other high-speed) measurement techniques, and so the measurement of the thickening and thinning of the urea film as exhaust system conditions change allows for the optimization of the SCR system (e.g., urea injection amount, timing, velocity, and the like) for different exhaust conditions. Prior art methods for determining film thickness, such as visual inspection, are not capable of real-time measurement.

While real-time measurements are useful for some applications of the provided embodiments, other applications may not benefit from such speed. For example, if the exhaust pipe condition determined is exhaust pipe shape, the shape of the exhaust pipe section 182 (prior to the exhaust system section 104) and the exhaust pipe 184 (subsequent to the exhaust system section 104) are not likely made from a material that can be easily reshaped (e.g., the exhaust pipe sections 182 and 184 are typically made from a material that cannot be readily bent so as to change the shape). Thus, when the provided embodiments are used to determine the effect of exhaust pipe shape on the thickness of the urea film, an exemplary process flow is to (1) measure a first thickness of a urea film, (2) determine the shape of the exhaust pipe sections 182 and/or 184, (3) optionally, determine the exhaust flow field produced by such exhaust pipe shapes, (4) modify the exhaust pipe shape, and (4) measure the urea film thickness after a period of time operating the exhaust system through the new exhaust pipe shape. The thickening or thinning of the measured urea film provides insight as to the improvement or degradation of the SCR process resulting from the change in exhaust pipe shape, and the resulting flow field.

When performing the methods provided herein, the measurements made by the optical system may not always detect urea at the measurement location 132 (i.e., there may be no urea present). For example, prior to any urea injection (e.g., a "clean" exhaust system section 104), the measurement of the measurement location 132 on the interior surface 13 of the exhaust system will be nil (e.g., zero inches). Upon operating the engine and the urea injector, urea buildup will typically occur. The urea film 252 is then measured by the provided embodiments. Additionally, as has been described herein, it is desirable to determine an optimized SCR process such that injection parameters, as well as exhaust pipe conditions, are determined that allow for operation of the engine and the SCR system such that no buildup occurs. In such an optimized system, any measurements at the measurement location 132 would result in a nil measurement because no urea film 252 would accumulate on the inner surface 144 of the exhaust system section 104.

With regard to the materials used to manufacture the optical window 110, typical materials include temperature-resistant glasses and polymers. The maximum termperature the optical window 110 will be exposed to is from 600-800° C. The optical window 110 will optically transmit light at the wavelength used by the emitter 124, and will resist the temperature and chemical events occurring within the exhaust system (e.g., it will withstand the temperatures of the exhaust gas without warping or degrading).

Regarding the materials used to fabricate the other components of the exhaust system section 104 (and exhaust system), such materials are known to those of skill in the art and are not the focus of the present disclosure.

While solid urea films are discussed herein with regard to the thickness measurements provided by the systems and methods, optical measurement techniques adapted to measure liquid, or mixtures of solid and liquid, films, are also useful in embodiments of the present disclosure. It is known that when urea solution adheres to a surface, such as on an interior wall 144 of an exhaust system section 104, the adhered film is first liquid, which then crystallizes into a solid urea film 252 given certain conditions (e.g., temperature and time). A solid urea film 252 built up on an interior surface 144 is then a substrate upon which further liquid urea solution can build up, which may then eventually solidify, and so forth. Thus, embodiments of the invention include measuring: 1) only the solid portion of the urea film; 2) only the liquid portion of the urea film; and 3) the combined solid and liquid portions of the urea film.

In embodiments of the present disclosure, the systems and methods are integrated and performed in relation to an exhaust system under controlled conditions, such as in a vehicle production facility or a testing laboratory. However, the systems and methods disclosed herein may be used on a vehicle in use so as to provide real time adjustment of urea dosing so as to eliminate urea buildup during regular vehicle operation.

Finally, while optical methods have been described above, it will be appreciated that another embodiment substitutes ultrasound measurement techniques for the optical methods described above. As ultrasound can image through some materials, the optical window 110 may not be needed to allow the ultrasound signal to reach the measurment location 132. Therefore, an ultrasound meter is directed to the exterior of the measurement location 132 wall to determine the thickness of the urea film built up at the measurement location 132.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A method for comparing a thickness of a film of a reductant for nitrogen oxides on an interior surface of an exhaust pipe system to exhaust pipe system conditions, wherein the exhaust pipe system comprises an exhaust pipe connected to an exhaust port of a nitrogen-oxides producing engine and a selective catalytic reduction injector configured to introduce a reductant solution of the reductant into the exhaust pipe, the method comprising:
   (a) measuring a first thickness of the film at a measurement location within the exhaust pipe system at a first measurement time;
   (b) introducing a reductant solution from the injector into the exhaust pipe during operation of the engine;
   (c) measuring a second thickness of the film at the measurement location at a second measurement time;
   (d) using a control unit to determine at least one exhaust pipe system condition, wherein the control unit comprises one or more computers, computing devices, microcontrollers, programmable logic controllers, or combinations thereof; and
   (e) using the control unit to compare the first thickness of the film and the second thickness of the film with the at least one exhaust pipe system condition between the first measurement time and the second measurement time.

2. The method of claim 1, wherein the measurement location is on an interior surface of the exhaust pipe system in liquid communication with the injector.

3. The method of claim 1, wherein the at least one exhaust pipe condition is selected from the group consisting of an exhaust flow rate, an exhaust temperature, an injector configuration, an exhaust pipe cross-sectional shape, an exhaust pipe longitudinal shape, and an exhaust flow field.

4. The method of claim 1, wherein determining at least one exhaust pipe system condition comprises determining at least one exhaust pipe system condition between the first measurement time and the second measurement time.

5. The method of claim 1, wherein the first measurement time and the second measurement are separated by about 1 second.

6. The method of claim 1, wherein the reductant for nitrogen oxides comprises urea.

7. The method of claim 1, wherein the first thickness is nil.

8. The method of claim 1, wherein measuring the first and second thicknesses of the film comprises measuring the first and second thicknesses of the film with an optical measurement system.

9. The method of claim 8, wherein the optical measurement system comprises a light source and a light detector, each in optical communication with the measurement location within the exhaust pipe system.

10. The method of claim 9, wherein the light source is a laser.

11. The method of claim 8, wherein the exhaust pipe system comprises an optical window configured to provide optical communication between an exterior of the exhaust pipe system and the measurement location within the exhaust pipe system, and wherein at least one of the light source and the light detector are disposed outside the exhaust pipe system and in optical communication with the optical window.

12. The method of claim 11, wherein the optical window is formed from a temperature-resistant material.

13. The method of claim 1, wherein the film is selected from the group consisting of a solid, a liquid, and a mixture thereof.

14. The method of claim 1, wherein comparing the first thickness of the film and the second thickness of the film with the at least one exhaust pipe system condition between the first measurement time and the second measurement time comprises correlating the first thickness of the film and the second thickness of the film with the at least one exhaust pipe system condition between the first measurement time and the second measurement time.

15. The method of claim 1 further comprising adjusting at least one exhaust pipe system condition in response to comparing the first thickness of the film and the second thickness of the film with the at least one exhaust pipe system condition between the first measurement time and the second measurement time.

16. A system for measuring a thickness of a film of a reductant for nitrogen oxides at a measurement location on an interior surface of an exhaust pipe system comprising the exhaust pipe connected to an exhaust port of an engine and a selective catalytic reduction injector configured to introduce a solution of the reductant into the exhaust pipe, the system comprising:
   (a) a light source in optical communication with the measurement location;
   (b) a light detector in optical communication with the measurement location and the light source;
   (c) one or more controllers configured to operate the light source and the light detector;
   (d) one or more sensors operatively connected to the controller and configured to measure a characteristic of the exhaust pipe system selected from the group consisting of an exhaust flow rate, an exhaust temperature, and an exhaust flow field; and
   (e) a control unit operatively connected to the one or more controllers and the one or more sensors, said control unit configured to determine the thickness of the film at the measurement location and compare the thickness to the measured characteristic of the exhaust pipe system.

17. The system of claim 16, wherein the light source is a laser.

18. The system of claim 16, wherein the exhaust pipe system comprises an optical window configured to provide optical communication between an exterior of the exhaust pipe system and the measurement location, and wherein at least one of the light source and the light detector are disposed outside the exhaust pipe system and in optical communication with the optical window.

19. The system of claim 16, wherein the measurement location provides reflective optical communication between the light source and the light detector.

20. The system of claim 16, wherein the interior surface is a surface of the injector.

* * * * *